United States Patent [19]

Watton et al.

[11] Patent Number: 5,779,760
[45] Date of Patent: Jul. 14, 1998

[54] FIBER MANUFACTURING SPINNER

[75] Inventors: William A. Watton, Pickerington; James G. Snyder, Newark, both of Ohio

[73] Assignee: Owens Corning Fiberglas Technology, Inc., Summit, Ill.

[21] Appl. No.: 722,399

[22] Filed: Sep. 30, 1996

[51] Int. Cl.[6] .................................................. C03B 37/04
[52] U.S. Cl. ................................ 65/497; 65/502; 65/504; 65/521; 65/438; 264/DIG. 26; 264/211.1; 264/168; 425/8; 425/72.2
[58] Field of Search ............................. 65/502, 504, 516, 65/521, 438, 459, 470, 497; 264/211.1, DIG. 26, DIG. 28, 168, 174, 8; 425/8, DIG. 217, 72.2, 464

[56] References Cited

U.S. PATENT DOCUMENTS

| | | |
|---|---|---|
| Re. 24,708 | 9/1959 | Heymes et al. . |
| 2,199,309 | 4/1940 | Freudenberg . |
| 2,582,561 | 1/1952 | Peyches . |
| 2,984,864 | 5/1961 | Levecque et al. . |
| 2,998,620 | 9/1961 | Stalego . |
| 3,026,563 | 3/1962 | Slayter et al. . |
| 3,078,691 | 2/1963 | Charpentier et al. . |
| 3,254,482 | 6/1966 | Stalego . |
| 4,203,745 | 5/1980 | Battigelli et al. . |
| 4,203,748 | 5/1980 | Battigelli et al. . |
| 4,294,783 | 10/1981 | Snowden . |
| 4,534,779 | 8/1985 | Herschler . |
| 4,622,054 | 11/1986 | Huey et al. . |
| 4,718,930 | 1/1988 | Gartner et al. . |
| 4,832,723 | 5/1989 | Shisler et al. . |
| 5,326,241 | 7/1994 | Rook et al. . |
| 5,468,275 | 11/1995 | Lin et al. . |
| 5,474,590 | 12/1995 | Lin . |
| 5,482,527 | 1/1996 | Czastkiewicz . |
| 5,582,841 | 12/1996 | Watton .................... 65/502 |

*Primary Examiner*—John Hoffmann
*Attorney, Agent, or Firm*—C. Michael Gegenheimer; Curtis B. Brueske

[57] ABSTRACT

A spinner is adapted to be fixed at one end of a rotatable shaft in a fiberizer, the spinner including a radial wall extending radially out from the shaft and having an upper surface, a dam separating the upper surface into an inner portion and an outer portion, a lower surface, at least one first flow hole connecting the upper surface to the lower surface, and at least one second flow hole connecting the inner portion and the outer portion of said upper surface, and an outer peripheral wall connected to the radial wall and having a plurality of orifices therethrough.

16 Claims, 4 Drawing Sheets

FIBER MANUFACTURING SPINNER

CROSS-REFERENCE TO RELATED APPLICATION

The present application is related to U.S. patent application Ser. No. 08/435,010, filed May 4, 1995 and entitled FIBER MANUFACTURING SPINNER AND FIBERIZER, which is assigned to the assignee of the present application now U.S. Pat. No. 5,582,841.

TECHNICAL FIELD

The present invention relates to an apparatus for manufacturing fibers from thermoplastic materials, and more particularly to a fiberizer with a spinner for centrifuging single or multiple component fibers from molten thermoplastic materials such as glass or other minerals or polymers.

BACKGROUND ART

Fibers of glass and other thermoplastic materials are useful in a variety of applications including acoustical or thermal insulation materials. Common prior art methods for producing glass fiber insulation products involve producing glass fibers from a rotary process. A single glass composition or multiple glass compositions are melted and forced through orifices in the outer peripheral wall of a centrifuge, known as a centrifugal spinner, to produce the fibers. One commonly used spinner is generally cup shaped with a bottom wall with a central hole, a top opening and an outer peripheral wall which curves upward from the bottom wall, forming the top opening. The lower end of a drive shaft, used to rotate the spinner, extends down through the top opening and is fixed to the center of the bottom wall with a quill. The central hole of the bottom wall is simply press-fit onto the outside diameter of the quill, and the quill is mounted to the lower end of the drive shaft.

The spinner becomes very hot during the fiber manufacturing process. Because of the high temperatures reached, the spinner walls are necessarily made from a high temperature resistant material, typically a high temperature metal alloy. Even so, at such high temperatures, the spinner exhibits a tendency to creep and sag downward as the spinner rotates. This deformation can significantly reduce the creep life of the spinner and can introduce process variables that adversely impact fiber production. The problem of creep tends to become more pronounced as the size of the spinner increases.

In addition, because it is simply press-fit on to the quill, the spinner has a tendency to loosen around the quill over time, due to thermal expansion, rotational stresses and creep to which the spinner and quill are subjected. As the fit loosens, the spinner can move off-center, resulting in a serious problem of excessive vibration and warping of the spinner. This problem generally becomes more pronounced as the size of the spinner, and thus the diameter of the central hole, increases.

Accordingly, there is a need for an improved spinner that is less likely to exhibit temperature induced deformation that reduces the creep life of the spinner and introduces undesirable process variables during the fiber manufacturing process.

SUMMARY OF THE INVENTION

This need is met by a spinner adapted to be fixed at one end of a rotatable shaft in a fiberizer, the spinner comprising a radial wall extending radially out from the shaft and having an upper surface, a dam separating the upper surface into an inner portion and an outer portion, a lower surface, at least one first flow hole connecting the upper surface to the lower surface, and at least one second flow hole connecting the inner portion and the outer portion of the upper surface, and an outer peripheral wall connected to the radial wall and having a plurality of orifices therethrough.

This need is also met by an apparatus for making fibers including a rotatable shaft, and a spinner fixed at one end of the rotatable shaft, wherein the spinner includes an outer peripheral wall having a plurality of orifices therethrough for centrifuging fibers from a molten thermoplastic material, a top opening and a bottom opening between the outer peripheral wall and the shaft, and a radial wall positioned between the top opening and the bottom opening and extending radially out between the outer peripheral wall and the shaft. The radial wall includes an upper surface, a dam disposed so as to separate the upper surface into an inner portion and an outer portion, a lower surface, at least one first flow hole disposed radially before the dam and formed through the radial wall so as to connect the upper surface to the lower surface, and at least one second flow hole formed through the dam so as to connect the inner portion and the outer portion of the upper surface. The apparatus further includes a source of molten thermoplastic material located above the inner portion of the upper surface, such that supply of the molten thermoplastic material to the inner portion of the upper surface when the rotatable shaft rotates causes the molten thermoplastic material to flow radially outward across the upper surface through the first flow hole and the second flow hole to the orifices both above and below the radial wall.

The objectives, features, and advantages of the present invention will become apparent upon consideration of the description herein and the appended claims and drawings.

SUPPORT MATERIAL

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

Figure 1:
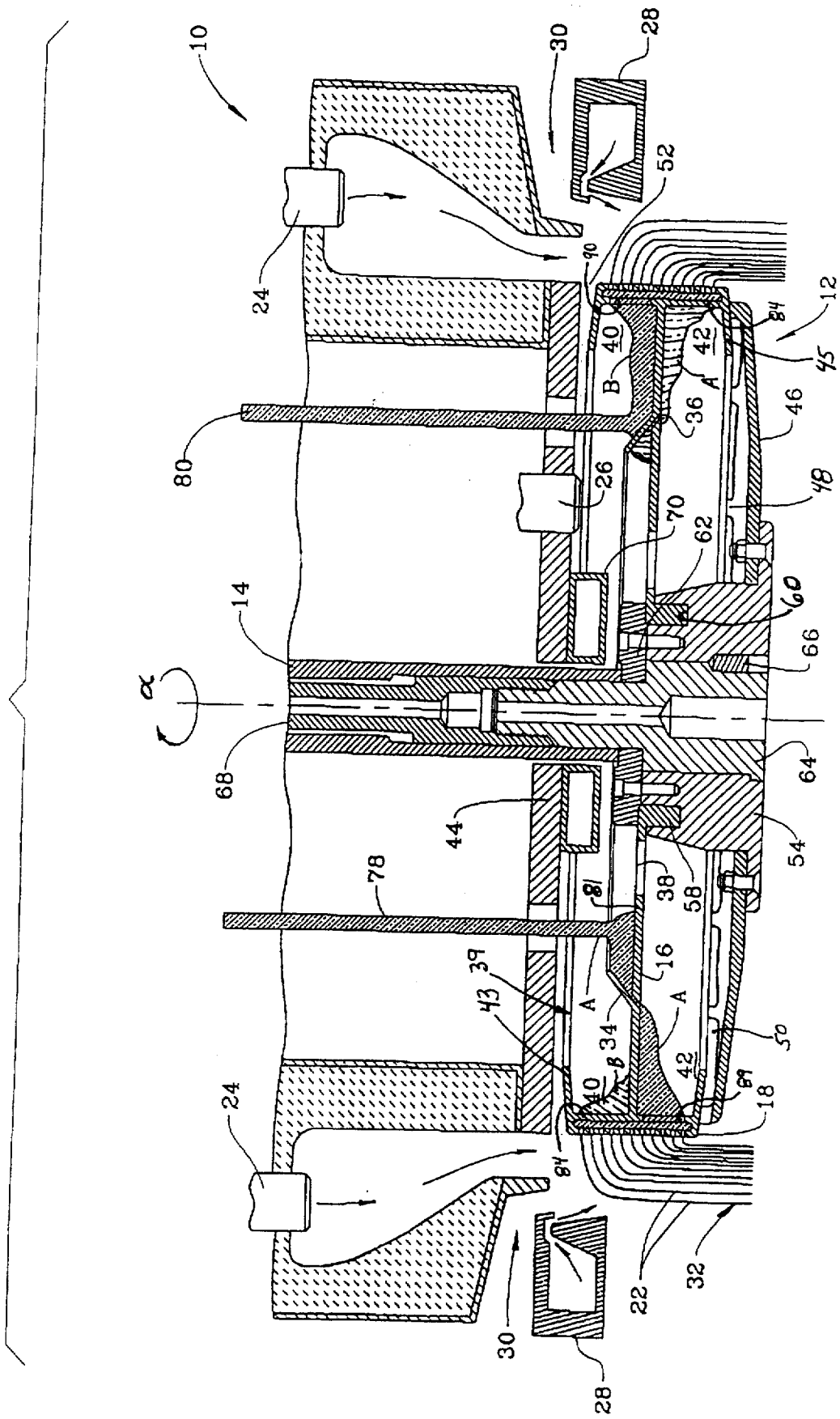
FIG. 1 is a partially schematic cross-sectional view in elevation of a fiberizer with a spinner similar to the present invention.
Figure 2:
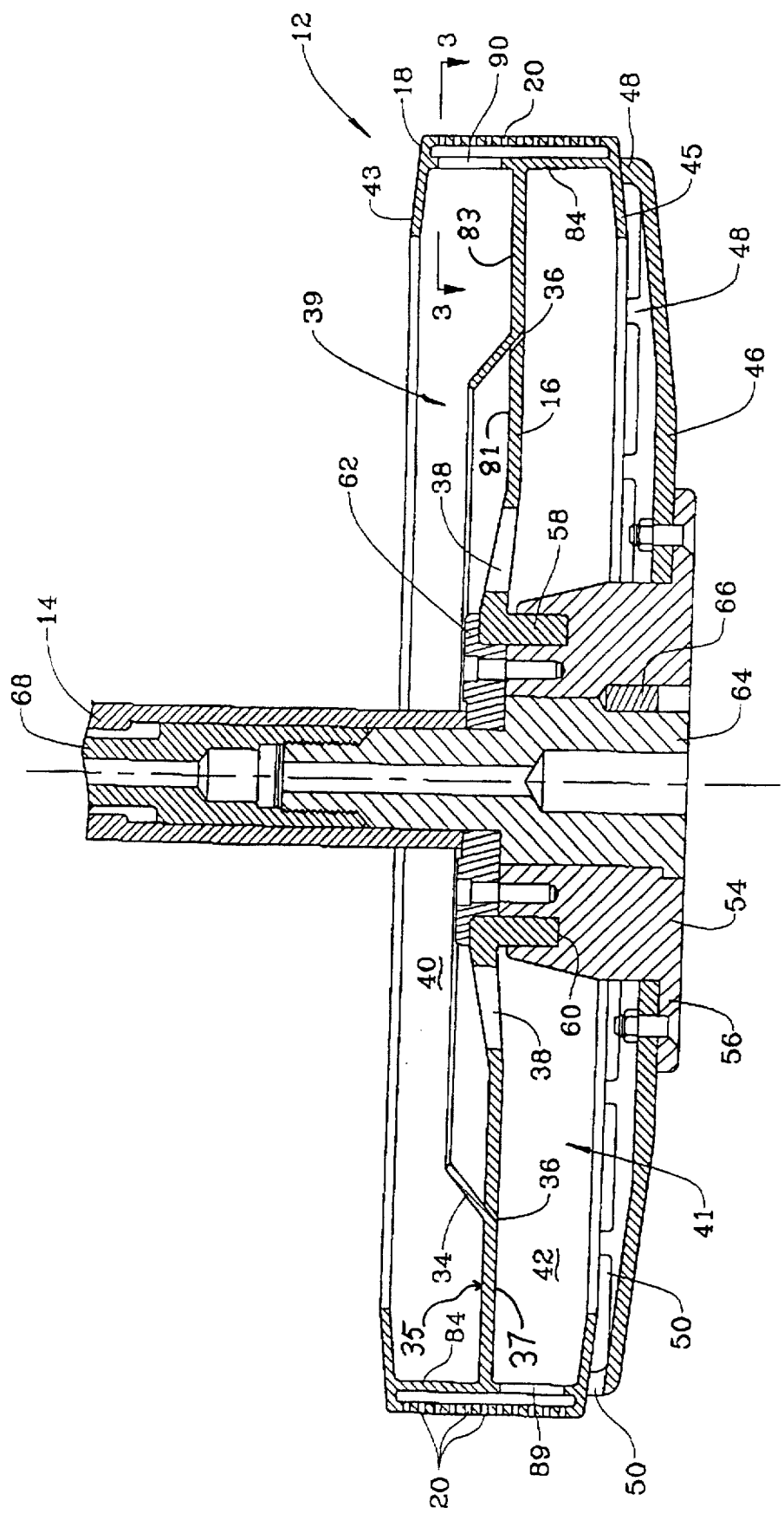
FIG. 2 is a cross-sectional view in elevation of an alternative embodiment of the spinner of FIG. 1, mounted at the end of the spindle.
Figure 2A:
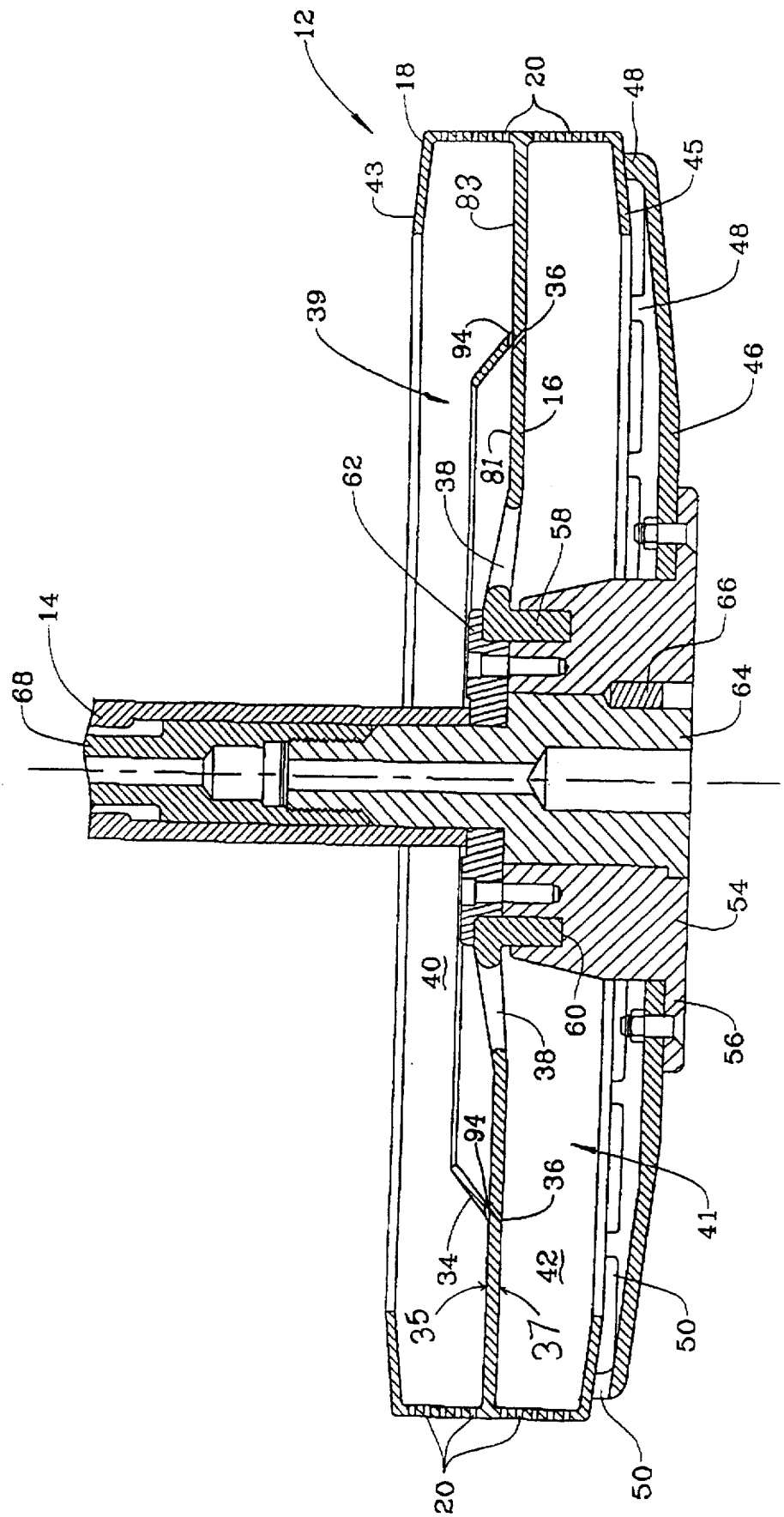
FIG. 2A is a cross-sectional view in elevation of an embodiment of the spinner of the present invention, mounted at the end of the spindle.

Referring to FIGS. 1, 2 and 2A, a fiber manufacturing apparatus or fiberizer 10 includes a centrifuge or spinner 12 fixed to the lower end of a rotatable hollow shaft or spindle 14. The spinner 12 is rotated by rotating spindle 14, as is known in the art. The spinner 12 includes a radial wall 16 that extends radially out from the spindle 14 and has an outer periphery. An outer peripheral wall 18 is disposed around the outer periphery of the radial wall 16 and has a plurality of orifices 20 for centrifuging fibers 22 of a molten thermoplastic material, for example glass. FIGS. 1, 2 and 2A show three alternative embodiments of the spinner 12. Since these spinners 12 include many components which are substantially identical or at least similar, such components are indicated by the same numerals and are not explained repeatedly herein.

The rotation of the spinner 12 (as depicted by the circular arrow ∝ in FIG. 1) centrifuges molten glass through orifices 20 in spinner peripheral wall 18 to form primary fibers 22. The primary fibers 22 are maintained in a soft, attenuable condition by the heat of an annular burner 24. A plurality of internal burners 26 are circumferentially disposed around spindle 14 and used to heat the interior of spinner 12 to prevent the molten thermoplastic material from solidifying or devitrifying before being formed into fibers. An annular blower 28, using induced air through passage 30, is positioned to pull primary fibers 22 and further attenuate them into secondary fibers 32, suitable for use in a product, such as wool insulating materials. The secondary fibers 32 are then collected on a conveyor (not shown) for formation into a product, such as a glass wool pack.

The spinner 12 has an integrally formed circular dam 34 extending up from the upper surface 35 of radial wall 16 and angling back toward the axis of rotation of spindle 14. A plurality of circumferentially spaced first flow holes 36 are formed through radial wall 16, connecting its upper surface 35 and lower surface 37. Each first flow hole 36 is formed through radial wall 16 just on the inside of dam 34 at an acute angle to wall 16. Dam 34 is formed at a similar acute angle to radial wall 16. A plurality of gas vent holes 38 are formed through radial wall 16 to provide paths for the hot exhaust gases from the internal burners 26 to flow through radial wall 16. These hot gases flow from burners 26, through a top opening 39 formed by an upper annular lip 43 and into an upper chamber 40 of spinner 12 formed above radial wall 16. The hot gases then flow through the vent holes 38, into a lower chamber 42 formed below radial wall 16 and through a bottom opening 41 formed by a lower annular lip 45. The spinner 12 is open at its top and bottom, at least in part, so that it is radially balanced during the centrifuging of fibers.

It is important for the upper and lower chambers 40 and 42 of the spinner 12 to remain at a temperature which allows the molten thermoplastic material to readily flow. Therefore, a portion 44 of the fiberizer 10, typically a bearing housing, directly above the spinner 12 is operatively adapted to substantially cover the top opening 39 of spinner 12. A circular plate or radiation shield 46 is used to substantially cover the bottom opening 41 of spinner 12. In this way, the desired high temperature can be maintained inside spinner 12. It is desirable for a plurality of circumferentially separated spacers 48 to be formed along the outer periphery of shield 46. These spacers 48 maintain the shield 46 a minimum distance from the spinner 12.

A plurality of gaps 50 are formed around the outer periphery of shield 46, one gap 50 between any two adjacent spacers 48. These gaps 50 provide a path for the exhaust gases from the burners 26 to flow through and exit out of lower chamber 42, improving the circulation and flow of the gases through the spinner. The lower corner of the peripheral wall of some prior art spinners have experienced cooling problems, resulting in the thermoplastic material solidifying prematurely. This undesirable cooling is believed to be caused by insufficient circulation of the hot gas in the spinner's lower chamber 42. Allowing the hot gas to flow out of the lower chamber 42, for example, through the gaps 50 reduces this problem.

Exhaust gases entering the upper chamber 40 from burners 26 are also able to flow through and out of the upper chamber 40 through a space 52 formed between the spinner 12 and the housing portion 44. In this way, hot exhaust gases from burners 26 are able to circulate adjacent to the top and bottom of the peripheral wall 18, thereby controlling the temperature profile over the entire spinner wall 18. Maintaining a more uniform temperature profile throughout the interior of spinner 12 helps to ensure that the thermoplastic material remains sufficiently molten to properly flow at the bottom as well as the top of peripheral wall 18 and through the orifices 20. The temperature balance over the height of the peripheral wall 18 can be adjusted by changing the relative sizes of the top and bottom gaps 52 and 50. Increasing the size of the bottom gap 50 relative to the top gap 52 has been found to increase the temperature at the bottom of the spinner wall 18 and vice versa. In this way, the optimum temperature distribution over the wall 18 can be achieved. This can result in improved fiber forming conditions, high spinner corrosion life, and the elimination of glass devitrification at the bottom of the peripheral wall 18.

The heat shield 46 is a separate element from the radial wall 16 and peripheral wall 18 so that the mass of shield 46 has little, if any, effect on the radial balance of the spinner 12. Both the radial wall 16 of spinner 12 and the heat shield 46 are mounted on a hub 54. It is desirable for the spinner 12, at least the radial wall 16, and the hub 54 to be made from materials having similar coefficients of expansion. The hub 54 is mounted for rotation with the lower end of spindle 14. Hub 54 includes a lower circular shoulder 56, upon which the shield 46 rests and, preferably, is bolted. The radial wall 16 includes a circular flange 58 which is seated in a matching circular groove 60 formed in the top of the hub 54. A circular clamping plate 62 is bolted onto the top of hub 54 and over radial wall 16 so as to secure flange 58 in groove 60.

A hollow quill 64 is press fit in a bore hole formed through the center of hub 54 and locked in place with three circumferentially spaced locking pins 66. The upper end of the quill 64 is threaded into the lower end of a hollow drawbar 68. The drawbar 68 is spring loaded at the upper end of spindle 14 to draw plate 62, along with quill 64 and hub 54, up against the lower end of spindle 14. The quill 64 is partially cooled by circulating cooling air through a stepped bore formed through the drawbar 68 and into another stepped bore formed through the quill 64. The quill 64 is preferably cooled further with water circulated through an annular cooling jacket 70 disposed around spindle 14 and quill 64 and above hub 54. The quill 64 and hub 54 are each fabricated from a low thermal expansion alloy to minimize differential thermal expansion between them.

It is important to maintain the concentric relationship between the spinner 12 and the spindle 14. Allowing the spinner 12 to move off-center while centrifuging can cause excessive vibration and warping of the spinner 12. This has posed a serious problem with prior fiberizers, because, being subjected to high temperatures while in use, the central hole of the radial wall tends to increase in diameter over time relative to the hub, due to thermal expansion, rotational stresses and creep. If its central hole is allowed to so expand, the spinner may move off-center from the rotating shaft, resulting in excessive vibration and warping. This problem becomes more pronounced as the size of the spinner, and thus the diameter of the central hole, increases. Therefore, the present invention preferably includes structure for keeping the spinner 12 centered on the hub 54 and quill 64. For example, one way of keeping the spinner 12 centered includes adapting the outside diameter of the spinner flange 58 to snugly fit against the inside surface of the hub groove 60. With the quill 64 and hub 54 being made of low thermal expansion material and cooled as previously described, the spinner flange 58 forms a tighter fit against the inside surface of the groove 60 as flange 58 grows due to thermal expansion, rotational stresses and/or creep.

During the operation of the fiberizer 10, the radial wall 16 may become susceptible to thermal expansion cracking at the vent holes 38. To prevent such premature cracking of the radial wall 16, it may become desirable to emboss or otherwise increase the thickness of the radial wall 16 in the area surrounding each vent hole 38 (see FIGS. 2 and 2A). As another option, it may be desirable to change the shape of each vent hole 38 so as to be less of a stress concentrator. For example, each vent hole 38 could be made oval in shape, instead of circular, with the major axis of each oval hole being oriented to curve in a circumferential manner around the spinner flange 58. Alternatively, if necessary, each vent hole 38 can be modified both by being made oval in shape and by embossing the area around each hole 38.

Referring to the spinners 12 illustrated in FIGS. 1 and 2, the interior of spinner 12 is supplied with two separate streams of molten thermoplastic material, for example, as shown in FIG. 1, a first stream 78 containing glass A and a second stream 80 containing glass B. Conventional supply equipment can be used to supply these streams 78 and 80 of molten glass. Such molten glass supply equipment is well known in the industry and, therefore, will not be discussed in detail herein. As an alternative to containing a single molten thermoplastic material, it may be desirable for each stream 78 and 80 to contain a mixture of two or more molten thermoplastic materials (e.g., two or more glasses). In addition, each stream 78 and 80 may contain the same molten thermoplastic material.

The glass in both streams 78 and 80 drops directly onto the upper surface 35 of spinner radial wall 16 and flows outwardly due to the centrifugal force toward spinner peripheral wall 18. Glass A in molten glass stream 78 is positioned radially closer to spindle 14 and lands on an inner portion 81 of the upper surface 35, radially inside of dam 34. A build-up or head of Glass A is first formed against dam 34. Glass A then flows through the first flow holes 36, from the upper side to the underside of radial wall 16. The first flow holes 36 are sized and numbered to ensure that glass A does not escape over dam 34. Glass A continues to flow along the underside of wall 16 and towards peripheral wall 18, as shown. Glass B in molten glass stream 80 is positioned radially further from spindle 14 and lands on an outer portion 83 of the upper surface 35, radially outside of dam 34. Glass B then flows directly toward peripheral wall 18, as shown. Streams 78 and 80 can be disposed adjacent one another on the same side of spindle 14 but are preferably disposed to drop glasses A and B on opposite sides of spinner 12, as shown.

Figure 3:
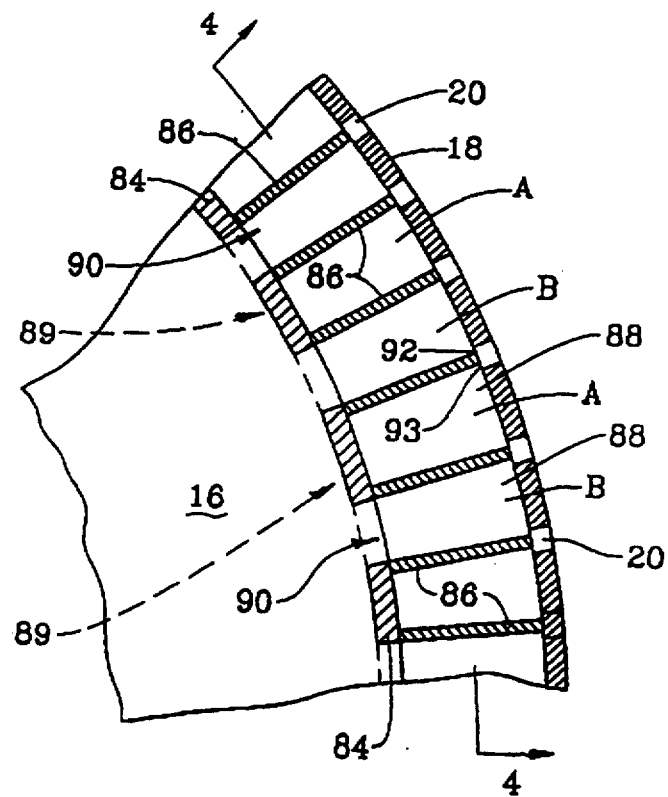
FIG. 3 is a plan view of a portion of the spinner of FIG. 2, taken along line 3—3.

As best shown in FIG. 3, the spinner 12 of FIGS. 1 and 2 is adapted with a vertical interior wall 84 which is generally circumferential and positioned radially inwardly from the spinner peripheral wall 18. As they flow toward peripheral wall 18, glasses A and B build-up against interior wall 84, above and below radial wall 16, respectively. The upper and lower annular lips 43 and 45 help to insure that the molten material does not flow around interior wall 84 and beyond the peripheral wall 18 (see FIG. 1). As shown in FIG. 3, a series of vertical baffles 86, positioned between spinner peripheral wall 18 and vertical interior wall 84, divide that space into a series of generally vertically-aligned compartments 88 which run substantially the entire height of spinner peripheral wall 18. Alternate compartments contain glass A and glass B which flow, respectively, into compartments 88 through slots 89 and 90 (see FIG. 1) formed an interior wall 84. It can be seen that radial wall 16, vertical interior wall 84, and baffles 86 together comprise a divider for directing glasses A and B into alternating adjacent compartments 88, respectively through slots 89 and 90, so that every other compartment contains glass A while the remaining compartments contain glass B.

Figure 4:
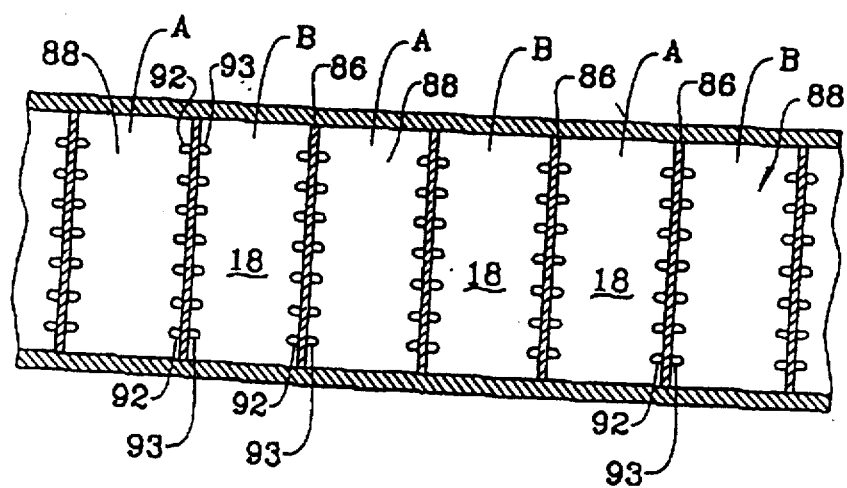
FIG. 4 is a cross-sectional view in elevation of the spinner of FIG. 3, taken along line 4—4.

As shown in FIG. 3, the orifices 20 on spinner peripheral wall 18 are each positioned adjacent to, and in general alignment with, the radial outward edges of the vertical baffles 86. As can been seen in FIG. 4, a series of passages 92 and 93 are located in each of the compartments 88 through which molten thermoplastic material will flow. Preferably, these passages are located adjacent either side of baffles 86 and communicate with orifices 20 on the outer surface of peripheral wall 18.

As shown, the passages 92 and 93 are generally vertically aligned and are preferably sized to provide equal flow lengths for the A and B glass components in adjacent compartments 88. This ensures that when the A and B components exit orifices 20 in side-by-side relation, there will be approximately equal amounts of A and B glasses for each fiber. It will be recognized that if unequal amounts of A and B glasses are desired, the passages 92 and 93 may be sized to provide for unequal amounts of flow causing unequal proportions in the resulting dual component fiber. Such a result may be desirable in certain instances. Additionally, the passages in each compartment may be modified to provide a variation in the ratios and configuration of A and B glasses in the dual component fibers formed. The number of passages formed depends on the height of the spinner peripheral wall 18. The number and size of the passages, as well as the flow rate of the molten glasses into compartments 88, is chosen to build up a "head" of molten material covering the passages in each compartment.

MODES FOR CARRYING OUT THE INVENTION

Referring to FIG. 2A, in a preferred embodiment of the spinner 12, a plurality of second flow holes 94 are disposed circumferentially around and formed through the dam 34 so as to connect the inner and outer portions 81 and 83 of the upper surface 35 of the radial wall 16. By including the second flow holes 94, the outer stream of molten material 80 may be eliminated and molten material from one stream (not shown) can be used alone to form fibers through orifices 20 located both above and below the radial wall 16. With this embodiment of the spinner 12, the resultant fibers are single component fibers formed from a single molten material or a mixture of molten materials, rather than multiple component fibers, like those formed using the spinners of FIGS. 1 and 2. Therefore, the ancillary structure associated with the peripheral wall 18 (i.e., the vertical interior wall 84, and the through slots 89 and 90) can be eliminated. The loss of this structure 84, 89 and 90 reduces the overall weight of the spinner 12 and the associated moment forces, which can help increase the creep life of the spinner 12.

The first and second flow holes 36 and 94 cause the molten thermoplastic material from the stream 78 to separate and flow to the orifices 20 at a desired ratio above and below the radial wall 16. The ratio of molten material flowing through holes 36 and 94 is not necessarily 50/50. To obtain optimum fiber quality and spinner corrosion life, it may be desirable to adapt the flow holes 36 and 94 so that more molten material flows through the holes 94 to the orifices 20 above the radial wall 16 than through the holes 36 to the orifices 20 below the radial wall 16. This ratio can be affected by a number of factors including the relative size and/or number of the flow holes 36 and 94 and the temperature distribution inside and outside of the spinner 12. Satisfactory results have been obtained when the first and second flow holes 36 and 94 are of a number and size which causes the molten material to flow to the orifices 20 at a ratio ranging from about 60/40 to about 80/20 above and below the radial wall 16, respectively.

It has been found that the flow rate of a melt through a hole is defined by the following equation $$F=Kd^4,$$

where:

F=flow rate

K=constant d=diameter of hole, and the flow rate through a number (n) of holes each having the same diameter (d) is defined by the following equation $$F=Knd^4.$$

Thus, if there are an identical number (n) of first and second flow holes 36, 94, with all of the first flow holes 36 having a first diameter and all of the second flow holes 94 having a second diameter, the following equation results $$\frac{F_u}{F_l} = \frac{Knd_2^4}{Knd_1^4} = \frac{d_2^4}{d_1^4}$$

where:

$F_u$=upper flow rate $F_l$=lower flow rate $d_2$=second diameter $d_1$=first diameter.

Solving this equation for flow rate ratios of between about 60/40 and 80/20 produces a diameter ratio of about 1.1 to about 1.4. In other words, if the first flow holes 36 consist of a number n of holes all having a first diameter $d_1$ and the second flow holes 94 consist of an equal number n of holes all having a second diameter $d_2$, then $d_2$ should be about 1.1 to about 1.4 times greater than $d_1$, to produce a flow rate ratio ranging from about 60/40 to about 80/20. Other methods can of course be used to produce the same results, such as by increasing the number of second flow holes 94.

Supplying more of the molten material from the stream 78 to the orifices 20 above the wall 16 has been found to cause the fibers issuing from those orifices to have a greater trajectory (i.e., to extend radially further out from the peripheral wall 18) than the fibers formed from the orifices 20 below the radial wall 16. This difference in trajectory has been found to help reduce contact between the fibers, thereby reducing surface defects and fiber fractures that can result from such contact. In addition, the upper chamber 40 of the spinner 12 is often hotter than the lower chamber 42. This temperature difference can cause the orifices 20 above the radial wall 16 to corrode and open up (i.e., enlarge) faster than the orifices 20 below the wall 16. As the orifices 20 above the wall 16 become larger, supplying more of the molten material 78 through the flow holes 94 helps to prevent a shortage of the molten material at the upper orifices 20. In this way, the throughput and corrosion life of the spinner 12 can be optimized.

It should be understood that because a flow of molten material can be supplied both above and below the radial wall 16, the present invention enables the spinner 12 of any of FIGS. 1, 2 and 2A to be radially balanced. In other words, the mass of the peripheral wall 18 above and below the radial wall 16 can be substantially equal. In addition, the masses of any other structures that may be connected to the peripheral wall 18, such as the upper and lower lips 43, 44, the interior wall 84 and the vertical baffles 86, can also be substantially equal above and below the radial wall 16. It of course should be understood that this manner of achieving mass equality amounts to forming the spinner 12 as substantially symmetrical about the radial wall 16. Other manners of achieving substantial mass equality can also work advantageously. This substantial mass equality reduces non-radial deformation of the spinner 12 and can increase spinner creep life by up to ten times or more. In addition, it should be noted that this spinner creep life increase is achieved by means of a relatively inexpensive spinner structure change, as opposed to what can be a relatively expensive spinner material upgrade.

The problem of temperature induced asymmetrical (i.e., non-radial) deformation is expected to become more pronounced for prior art spinners as the outer diameter of the spinner increases, especially for spinners having an outer diameter of at least about 12 inches (about 30.5 cm) or more. Such deformation is also expected to increase when the mass at the outer peripheral wall area of the spinner increases, as is often the case with outer peripheral walls adapted for making multiple component fibers. In both instances, the increase in asymmetrical deformation is due in large part to a resulting increase in moment forces acting downward at the outer periphery of the spinner. The principles of the present invention enable such detrimental deformation to be reduced, even for large diameter spinners and those designed to make multiple component fibers.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

We claim:

1. A spinner capable of being fixed at one end of a rotatable shaft in a fiberizer, said spinner comprising:

a radial wall having an upper surface, a dam separating said upper surface into an inner portion and an outer portion, a lower surface, at least one first flow hole connecting said upper surface to said lower surface, and at least one second flow hole connecting said inner portion and said outer portion of said upper surface; and an outer peripheral wall connected to said radial wall and having a plurality of orifices therethrough.

2. The spinner of claim 1, wherein said outer peripheral wall includes an upper lip and a lower lip, each said lip extending radially back toward the rotatable shaft, said radial wall being located between said upper lip and said lower lip.

3. The spinner of claim 1, wherein said peripheral wall has a mass above said radial wall and a mass below said radial wall and the masses of said peripheral wall above and below said radial wall are substantially the same.

4. The spinner of claim 1, wherein said spinner has a top opening and a bottom opening respectively disposed above and below said radial wall, and said spinner includes a shield adapted and disposed to substantially cover said bottom opening.

5. The spinner of claim 1, wherein said at least one first flow hole comprises a plurality of said first flow holes and said at least one second flow hole comprises a plurality of said second flow holes, wherein said pluralities of first and second flow holes are of a size and number to produce a molten thermoplastic material flow to said orifices above and below said radial wall in a ratio other than 50/50.

6. An apparatus for making fibers comprising:

a rotatable shaft;

a spinner fixed at one end of said rotatable shaft, said spinner comprising:
an outer peripheral wall having a plurality of orifices therethrough for centrifuging fibers from a molten thermoplastic material;
a top opening and a bottom opening between said outer peripheral wall and said shaft;
a radial wall positioned between said top opening and said bottom opening and extending radially out between said outer peripheral wall and said shaft, said radial wall having an upper surface, a dam disposed so as to separate said upper surface into an inner portion and an outer portion, a lower surface, at least one first flow hole disposed radially before said dam and formed through said radial wall so as to connect said upper surface to said lower surface, and at least one second flow hole formed through said dam so as to connect said inner portion and said outer portion of said upper surface; and a source of molten thermoplastic material located above said inner portion of said upper surface, such that supply of the molten thermoplastic material to said inner portion of said upper surface when said rotatable shaft rotates causes the molten thermoplastic material to flow radially outward across said upper surface through said at least one first flow hole and said at least one second flow hole to said orifices both above and below said radial wall.

7. The apparatus of claim 6, wherein said peripheral wall includes an upper lip and a lower lip, each lip extending radially toward said rotatable shaft, said radial wall being located between said upper lip and said lower lip.

8. The apparatus of claim 6, wherein said peripheral wall is symmetrical above and below said radial wall.

9. The apparatus of claim 6, further comprising a removable shield substantially covering said bottom opening of said spinner.

10. The apparatus of claim 9, further comprising a hub mounted at the one end of said shaft, wherein said hub has a shoulder and said shield has a central hole formed therethrough, said hub being disposed within said central hole and said shield being seated on said shoulder of said hub.

11. The apparatus of claim 6, further comprising a hub mounted at the one end of said shaft, wherein said radial wall is mounted in a groove in said hub.

12. The apparatus of claim 6, further comprising a hub mounted at the one end of said shaft, wherein a central hole is formed through said radial wall, said hub being disposed within said central hole, and said radial wall being mounted to a groove in said hub.

13. The apparatus of claim 12, wherein said radial wall includes at least one flange that at least partially defines said central hole, said flange extending into said groove.

14. The apparatus of claim 6, wherein said source supplies the molten thermoplastic material onto said inner portion of said radial wall through said top opening.

15. The apparatus of claim 6, wherein said at least one first flow hole comprises a plurality of said first flow holes and said at least one second flow hole comprises a plurality of said second flow holes, wherein said pluralities of first and second flow holes are of a size and number to allow a molten thermoplastic material to flow to said orifices above and below said radial wall in a ratio other than 50/50.

16. The apparatus of claim 6, wherein said spinner has an outer diameter of at least about 12 inches (30.5 cm).

* * * * *